United States Patent
Finstad

(10) Patent No.: US 7,562,608 B2
(45) Date of Patent: Jul. 21, 2009

(54) KERF SPACER FOR WOOD CUTTING SAW

(76) Inventor: Mark Thomas Finstad, 4541 200th LN NW., Oak Grove, MN (US) 55303

( * ) Notice: Subject to any disclaimer, the term of this patent is extended or adjusted under 35 U.S.C. 154(b) by 251 days.

(21) Appl. No.: 11/506,543

(22) Filed: Aug. 18, 2006

(65) Prior Publication Data

US 2007/0044610 A1 Mar. 1, 2007

Related U.S. Application Data

(60) Provisional application No. 60/712,649, filed on Aug. 30, 2005.

(51) Int. Cl.
*B23D 19/00* (2006.01)
*B26D 3/00* (2006.01)
*B26F 1/18* (2006.01)
*B25B 1/10* (2006.01)
*B27L 7/00* (2006.01)

(52) U.S. Cl. .......................... 83/102.1; 83/870; 83/873; 83/874; 269/243; 269/41; 269/203; 144/193.2; 144/194; 144/195.8

(58) Field of Classification Search ................ 83/102.1, 83/870, 873, 874; 269/243, 41, 203; 144/193.2, 144/194, 195.8; 254/104
See application file for complete search history.

(56) References Cited

U.S. PATENT DOCUMENTS

| | | | | |
|---|---|---|---|---|
| 1,192,185 A | * | 7/1916 | Gravel | 254/104 |
| 3,983,915 A | * | 10/1976 | Steele | 144/195.8 |
| 4,433,463 A | * | 2/1984 | DuVal | 29/239 |
| 4,451,024 A | * | 5/1984 | Shepherd | 254/104 |
| 5,290,012 A | * | 3/1994 | Cottriel et al. | 254/104 |
| 5,690,316 A | * | 11/1997 | Madjarac | 254/104 |
| 5,906,027 A | * | 5/1999 | Barous | 16/114.1 |
| 6,865,777 B2 | * | 3/2005 | Comstock | 16/114.1 |
| 7,293,488 B2 | * | 11/2007 | Wang | 83/102.1 |

* cited by examiner

*Primary Examiner*—Boyer D. Ashley
*Assistant Examiner*—Bharat C Patel

(57) ABSTRACT

Described is a device that is to used in conjunction with a chainsaw to keep the chainsaw kerf from closing, thereby greatly reducing the chance of having the chainsaw bar being pinched and bound. Also included is a limiting feature that keeps the chainsaw kerf spacer from being inserted too deeply into the chainsaw kerf, thereby contacting the chainsaw blades. Additionally, a handle is included to facilitate the extraction of the chainsaw kerf spacer from the chainsaw kerf after completing the cut. The kerf spacer can be installed with one hand and without the aid of tools.

3 Claims, 25 Drawing Sheets

SECTION A-A

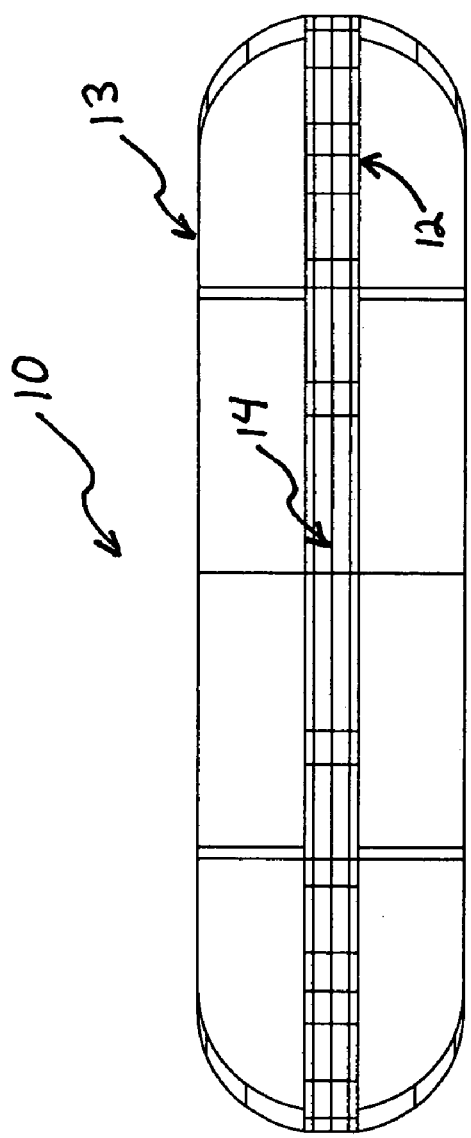
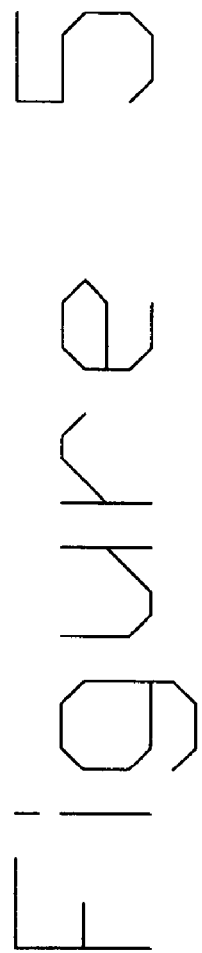

SECTION B-B

SECTION D-D

KERF SPACER FOR WOOD CUTTING SAW

CROSS REFERENCE TO RELATED APPLICATIONS

This application claims the benefit of U.S. provisional patent application No. 60/712,649, filed on Aug. 30, 2005, the entire contents of which are incorporated by reference as if fully set forth herein.

FIELD OF THE INVENTION

The present invention relates generally to the cutting of trees for firewood and clearing, and more specifically to an apparatus for holding the kerf from a wood cutting saw, or chainsaw, open until the cut is complete, keeping the saw blade or saw bar from becoming pinched.

BACKGROUND OF THE INVENTION

Motorized wood cutting saws, for example chainsaws, have been used for many years to quickly cut through trees and branches, making the wood suitable for burning or disposal.

Typically, while the tree is standing, a series of cuts are made at the base of the tree trunk to cause the tree to fall. After the tree is felled, the branches are removed, which results in the tree trunk lying horizontally on the ground. The trunk of a medium or large tree can weigh thousands of pounds. Also, since tree trunks are never perfectly straight, and since the ground is rarely perfectly flat, the trunk can be supported in unpredictable ways.

Often, when an attempt is made to cut the trunk into smaller pieces, the weight of the tree trunk, and the unpredictable support can cause the saw kerf to close prior to finishing the cut. As the kerf closes, it can pinch the blade or bar of the saw, stopping the saw from cutting any deeper, and making it nearly impossible to extract the saw bar from the kerf. When this happens, an additional chainsaw is often required to cut the pinched chainsaw free. This proves to be troublesome since most woodcutters will carry only one chainsaw into the cutting area.

One method of remedying the pinching problem is to use a large pry bar (cant hook) to lift the log a few inches off the ground several feet from one end. The cut is then made on the elevated end of the trunk. This method is effective, but requires that the woodcutter purchase a relatively expensive and heavy custom tool, and carry the tool into the woods each time wood is to be cut. Also, a very large tree trunk will weigh far too much to lift even with a large cant hook.

The other standard method for remedying the pinching problem employs a plastic or metal wedge (referred to as a bucking wedge) that is driven into the saw kerf to keep it from closing. Typical logging or bucking wedges are usually 2"-3" wide, approx 5"-8" long, and taper from 1" or more at the top, to a sharp edge at the bottom. Because of the relatively sharp taper of the bucking wedge, a hammer or mallet must be used to drive the wedge into the saw kerf. The draw back to the bucking wedge method is that an extra tool such as a mallet or hammer must be carried into the woods to drive the bucking wedge into the kerf. Also, since both of the wood cutter's hands are required to install the bucking wedge, the chainsaw must be stopped, and the chainsaw bar must be extracted from the kerf prior to installing the bucking wedge to reduce the possibility of injury to the wood cutter. Additionally, if the bucking wedge is driven too deep into the kerf, it will contact the blades on the top of the saw bar when it is re-inserted, resulting in damage to the saw chain or bucking wedge or both. A more dangerous result would be the bucking wedge being expelled from the kerf at high speed after contacting the chain. Examples of standard bucking wedges are shown in U.S. Pat. Nos. 4,451,024 and 5,290,012. An expandable wedge is shown in U.S. Pat. No. 4,130,270.

An anti-bind device for chainsaws is taught by King in U.S. Pat. No. 5,074,047. King teaches a number of embodiments of a device that permanently mounts to the bar of a chainsaw. The drawback to King's device is that the additional equipment mounted to the chainsaw would add a significant amount of weight to the saw, and would get tangled in brush when moving through wooded areas. Bass describes another anti-bind device, permanently mounted to a chainsaw in U.S. Pat. No. 4,534,112.

Another anti-bind device is shown in U.S. Pat. No. 3,983,915 by Steele called a "logging stop member". Steele teaches a spacing device of uniform thickness preferably constructed from aluminum. A straight abutment member is shown attached to one side of the stop member using bolts to make the abutment member adjustable. There are a number of problems with the Steele design. Even with a method for limiting the depth at which the stop member may be inserted into the saw cut, there would always be a chance that the stop member would come into contact with the moving blade of the chainsaw. The aluminum from the stop member could significantly dull, or destroy, the chainsaw blade, requiring the wood cutter to disassemble the chainsaw to replace the blade. Also, the plurality of pieces used to construct the stop member would make the unit costly. The main disadvantage to the Steele design is that the entire unit is planar and of uniform thickness. Since every chainsaw makes a cut that is slightly different in width, a wide range of stop member sizes would have to be offered to cover the wide variety of chainsaw brands employed today. Also, since a chainsaw cut is extremely rough, every cut from the same chainsaw is slightly different, which would require a woodcutter to carry several different stop member sizes into the woods to support one chainsaw. Then during the cutting operation, there is a good chance that more than one stop member would have to be tried to find the proper size. This would require shutting down the chainsaw and removing the blade from the cut in order to insert the proper size stop member.

SUMMARY OF THE INVENTION

An object of the present invention is to provide a chainsaw kerf spacer to maintain the width of a chainsaw kerf, therefore keeping the chainsaw bar from being bound or pinched.

Another object of the present invention is to provide a chainsaw kerf spacer that will work in conjunction with a large variety of chainsaws.

Another object of the present invention is to provide a chainsaw kerf spacer that can be installed with one hand.

Another object of the present invention is to provide a chainsaw kerf spacer that can be easily installed without the use of additional tools and without shutting down or removing the chainsaw from the kerf.

Another object of the present invention is to provide a chainsaw kerf spacer containing a depth-limiting feature or mechanism.

Another object of the present invention is to provide a chainsaw kerf spacer containing a handle for easy extraction of the spacer after the cut is complete.

Another object of the present invention is to provide a chainsaw kerf spacer that is brightly colored for high visibility in wooded areas.

Another object of the present invention is to provide a chainsaw kerf spacer that is very lightweight.

Another object of the present invention is to provide a chainsaw kerf spacer that is very inexpensive.

Another object of the present invention is to provide a chainsaw kerf spacer that will function on a wide range of tree truck diameters.

BRIEF DESCRIPTION OF THE DRAWINGS

FIG. 5 is a bottom view of the first embodiment of the chainsaw kerf spacer in accordance with the present invention.

DETAILED DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
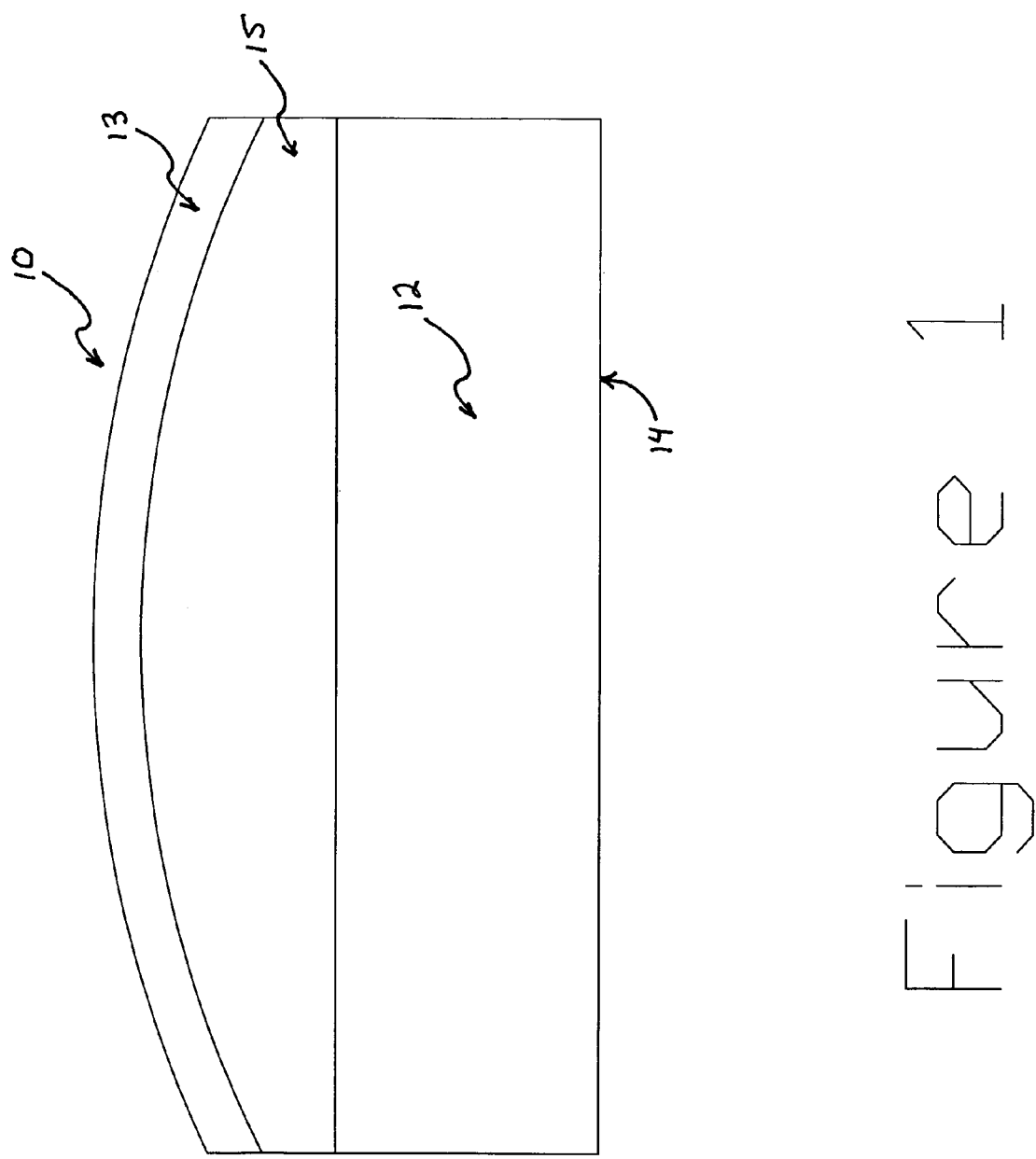
FIG. 1 is a side plan view of the first embodiment of the chainsaw kerf spacer in accordance with the present invention
Figure 2:
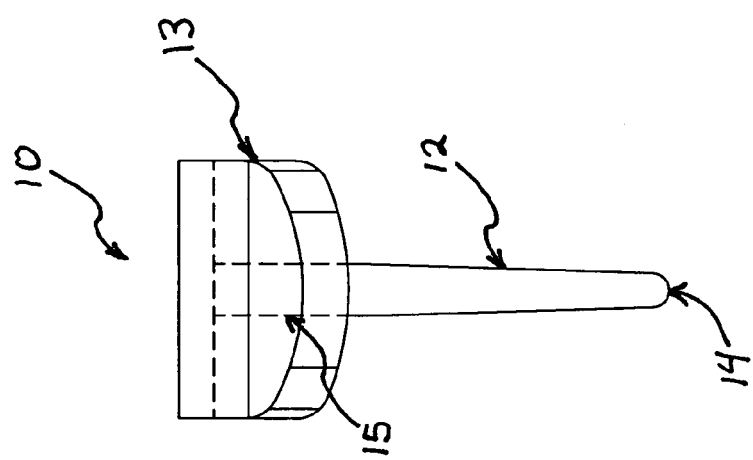
FIG. 2 is an end view of the first embodiment of the chainsaw kerf spacer in accordance with the present invention
Figure 3B:
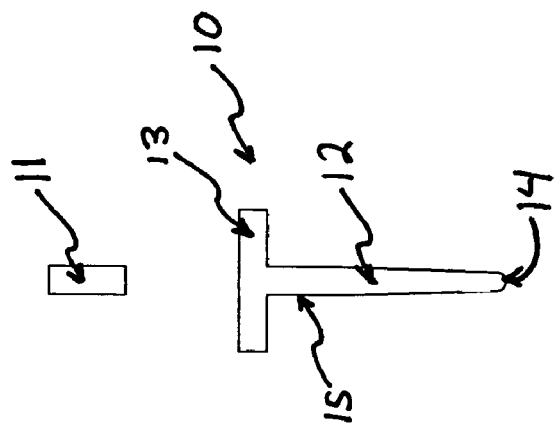
FIG. 3B is a perpendicular cross section view of the first embodiment of the chainsaw kerf spacer in accordance with the present invention including the additional handle portion.
Figure 3A:
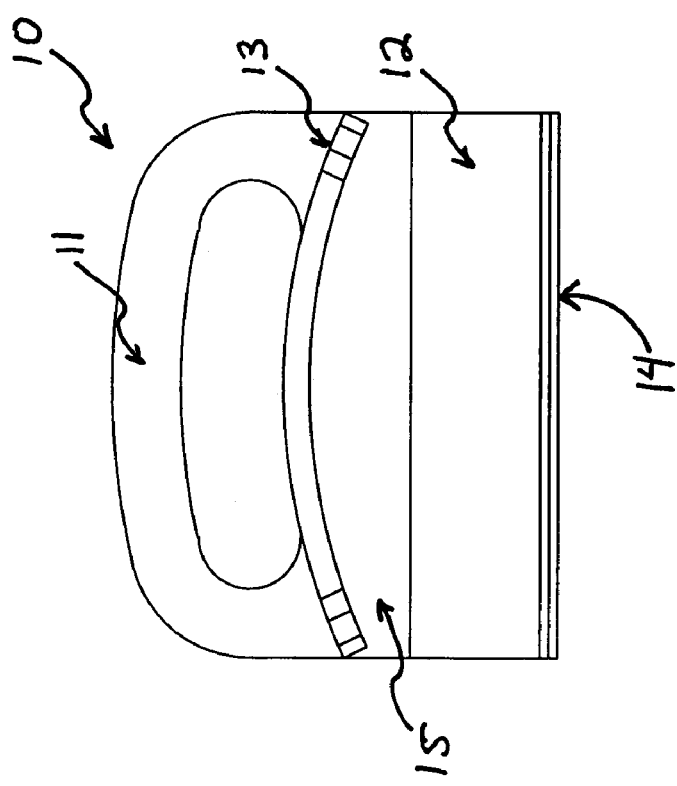
FIG. 3A is a side plan view of the first embodiment of the chainsaw kerf spacer in accordance with the present invention including the additional handle portion.
Figure 4:
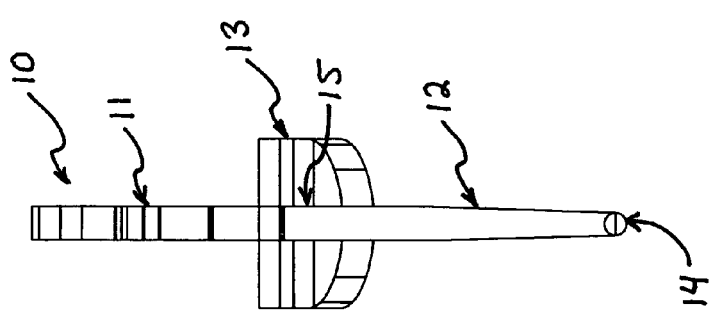
FIG. 4 is an end view of the first embodiment of the chainsaw kerf spacer in accordance with the present invention including the additional handle portion.

The first embodiment of the chainsaw kerf spacer 10 is particularly illustrated in FIGS. 1-7. The second and preferred embodiment of the kerf spacer 34 is particularly illustrated in FIGS. 14-19. FIG. 1 illustrates a side view of the first embodiment of the chainsaw kerf spacer 10 in accordance with the present invention. FIG. 3A illustrates a side view of the chainsaw kerf spacer 10 with the additional handle portion 11, lower wedge portion 12, and upper depth-limiting portion 13. FIG. 3B is a cross sectional view of the chainsaw kerf spacer through the center of the device illustrating the additional handle portion 11, lower wedge portion 12, and upper depth-limiting portion 13. FIG. 2 is an end view of the chainsaw kerf spacer.

The chainsaw kerf spacer 10 is preferably constructed of a rigid, high density, lightweight, plastic or composite material. The lower portion 12 of the chainsaw kerf spacer 10 may also be textured to aid in keeping the kerf spacer 10 in place until the cut is completed. The texturing may be a roughened surface, or a series of grooves running parallel to the narrow end 14 of the lower wedge portion. The chainsaw kerf spacer 10 is also preferably brightly colored (such as blaze orange) for high visibility in a wooded area.

Figure 22B:
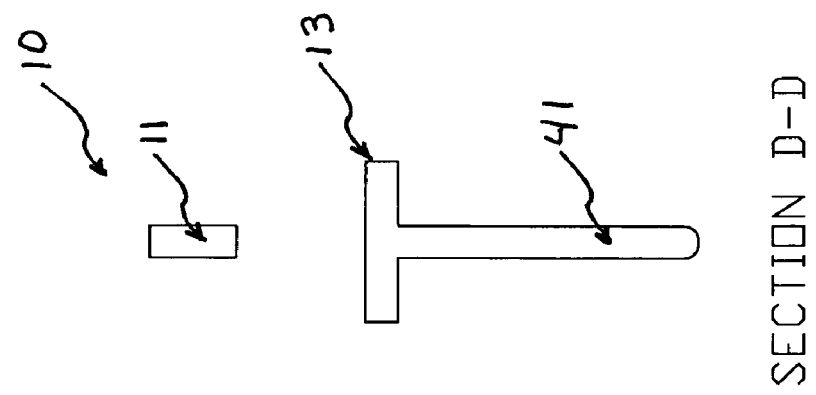
FIG. 22B is a cross sectional view of the first embodiment variation where the lower portion is planar.
Figure 22A:
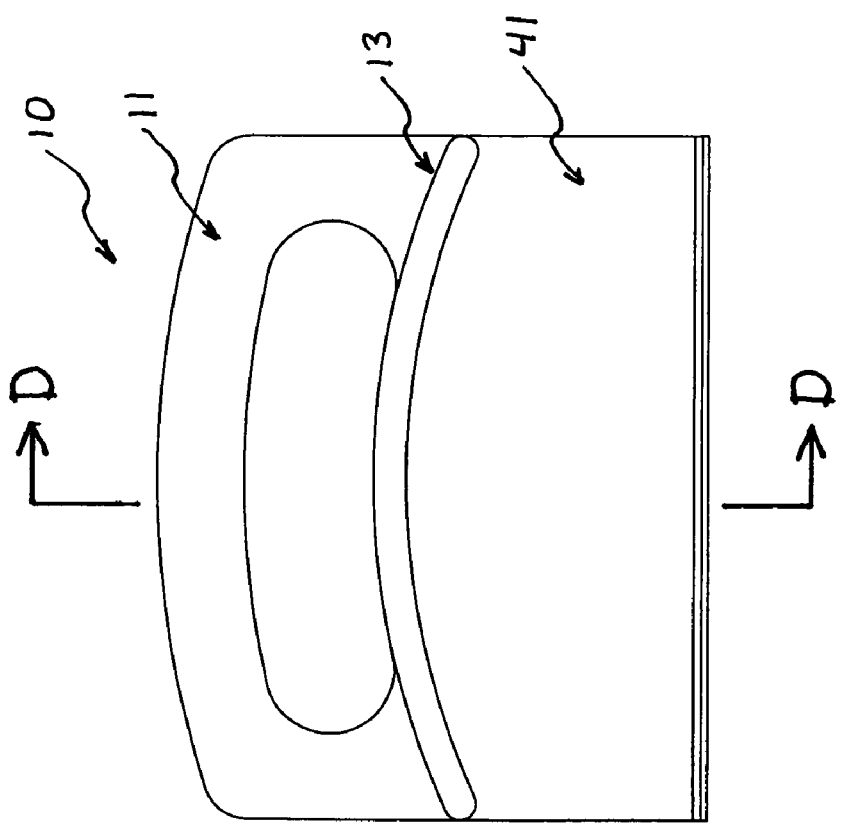
FIG. 22A is a front plan view of a first embodiment variation where the lower portion is planar.

In accordance with one aspect of the present invention, the lower wedge portion 12 is slightly tapered for ease of insertion into a chainsaw kerf 19. This critical feature allows the chainsaw kerf spacer 10 to be used with a wide variety of chainsaw sizes and brands. The taper angle is such that it is just great enough to assist in the insertion of the kerf spacer 10, but not great enough to allow the kerf spacer to work its way out of the chainsaw kerf 19 when pressure is applied due to the closing kerf. The narrow end of the lower wedge portion 14 is sized to be slightly narrower than the width of a small chainsaw kerf 19. The lower wedge portion 12 gradually increases in width moving towards the upper depth-limiting portion 13. The widest portion of the wedge 15 is sized to be approximately the width of a large chainsaw kerf. FIG. 22A and FIG. 22B illustrate a variation of the first embodiment, wherein entire lower portion of the chainsaw kerf spacer 41 is planar and slightly thinner than the width of a chainsaw kerf.

In accordance with another aspect of the present invention, the chainsaw kerf spacer 10 is provided with a handle 11 to facilitate the insertion of the kerf spacer 10 into the chainsaw kerf, and the extraction of the kerf spacer 10 from the chainsaw kerf 19 after completing the cut.

In accordance with another aspect of the present invention, the chainsaw kerf spacer 10 is provided with depth limiting features 13. The depth-limiting features 13 are constructed to contact the outer surface of a log being cut when the lower portion 12 of the kerf spacer 10 is fully inserted into the chainsaw kerf 19, keeping the kerf spacer 10 from being inserted any deeper, and possibly contacting the chainsaw blade. After a log has been cut through, the pieces can shift, causing the kerf to open up to many times the original width. The depth limiting features 13 are sized to make the kerf spacer 10 wide enough to keep it from dropping into the chainsaw kerf 19 after the cut is completed. The depth-limiting features 13 may be curved or straight protrusions extending out perpendicular to the front and/or rear surfaces of the kerf spacer 10.

Figure 6B:
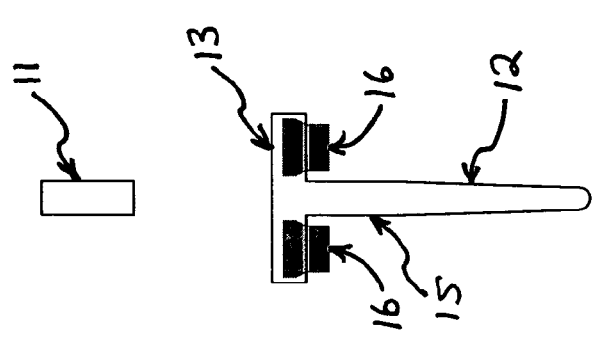
FIG. 6B is a cross sectional view through the center of the first embodiment of the chainsaw kerf spacer including the additional handle portion showing the metal over-molded pieces protruding from the bottom side of the upper depth limiting portion.
Figure 6A:
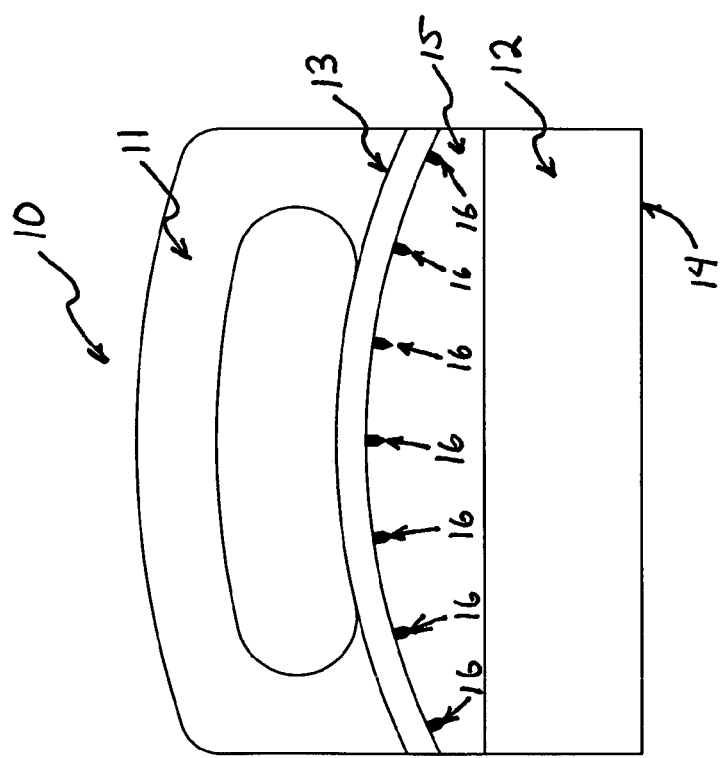
FIG. 6A is a side plan view of the first embodiment of the chainsaw kerf spacer including the additional handle portion, showing metal over molded pieces protruding from the bottom side of the upper depth limiting portion.
Figure 7:
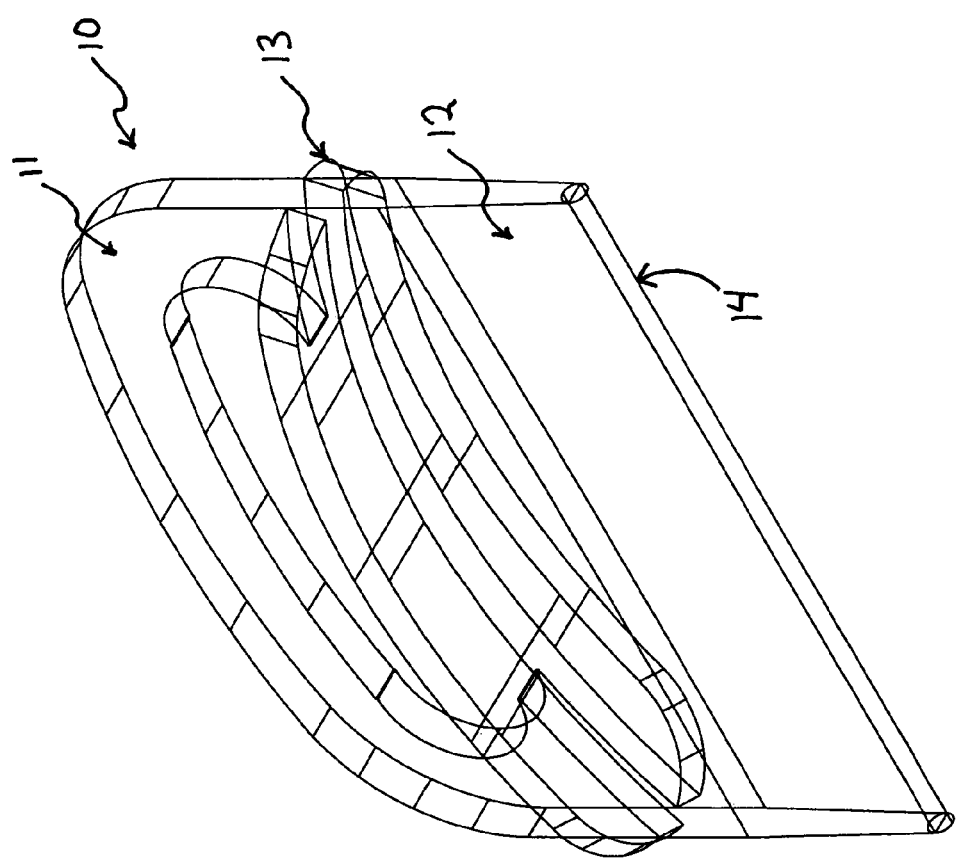
FIG. 7 a wire frame drawing, upper left view, of the first embodiment of the chainsaw kerf spacer including the additional handle portion in accordance with the present invention.

In a variation of the first embodiment, metal cleats 16 are molded into the depth-limiting features 13, extending downward to grip the barked surface of the log being cut, to keep the kerf spacer 10 in place. FIG. 6A is a side plan view of the kerf spacer 10 showing the metal cleats 16. FIG. 6B is a cross sectional view through the center of the kerf spacer 10 with the metal cleats 16. The portion of the metal cleats 16 that contact the log may be approximately as wide as the depth limiting features 13 with large serrations, or may be individual sharp pointed protrusions. However, any shape that contains sharp edges or points will provide this function.

In another variation of the first embodiment, the cleats extending downward from the depth-limiting features are constructed from the same material as the rest of the kerf spacer 10, and are shaped to grip the barked surface of the log.

Figure 13:
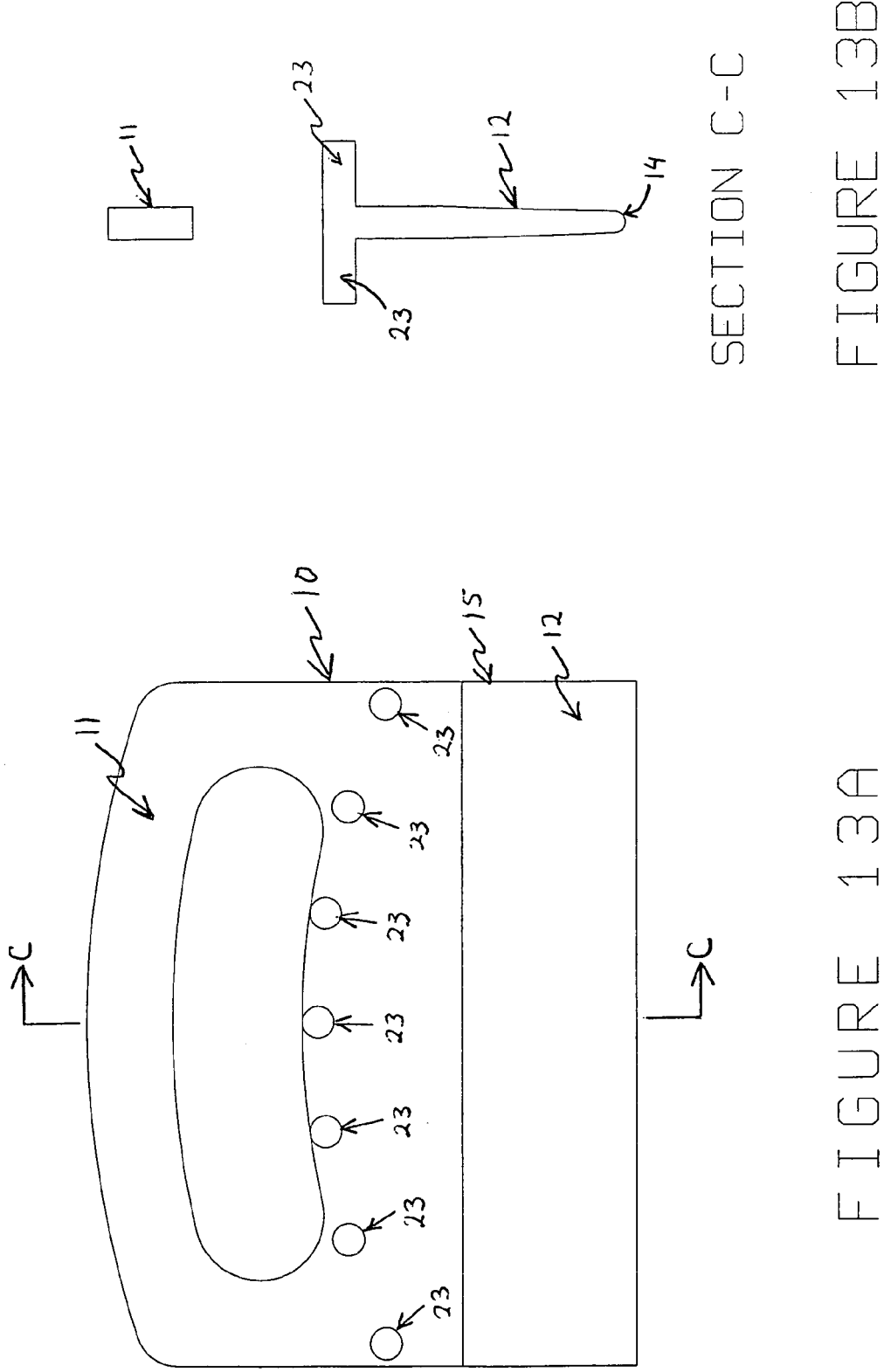
FIG. 13A is a side plan view of a variation to the first embodiment of the chainsaw kerf spacer including the additional handle portion, showing elongated protrusions used as the depth-limiting features.
FIG. 13B is a cross sectional view showing the elongated protrusions used as the depth-limiting feature.

The depth-limiting features may also be one or more elongated protrusions 23 extending perpendicular to the front and/or rear surfaces of the kerf spacer as illustrated in FIGS. 13A and 13B. The elongated protrusions may be positioned in a straight pattern or a curved pattern that generally follows the contour of the outer surface of a log.

Figure 8:
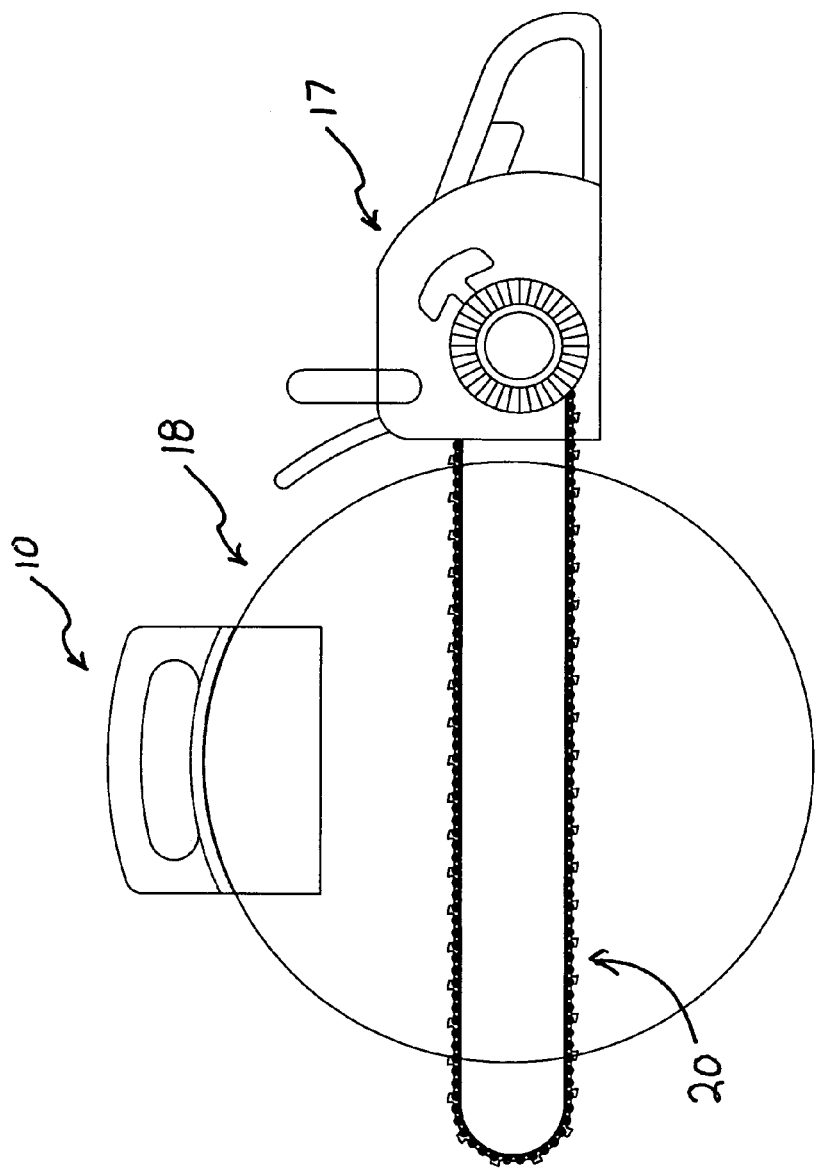
FIG. 8 is a cross sectional view through a chainsaw kerf, perpendicular to the horizontal axis of the log, showing the proper installation of the chainsaw kerf spacer in relation to a chainsaw.

FIG. 8 is a cross sectional view, perpendicular to the longitudinal axis of the log 18 and though a chainsaw kerf, which shows the chainsaw kerf spacer 10 properly inserted into the chainsaw kerf in relation to the chainsaw bar 20.

Figure 9:
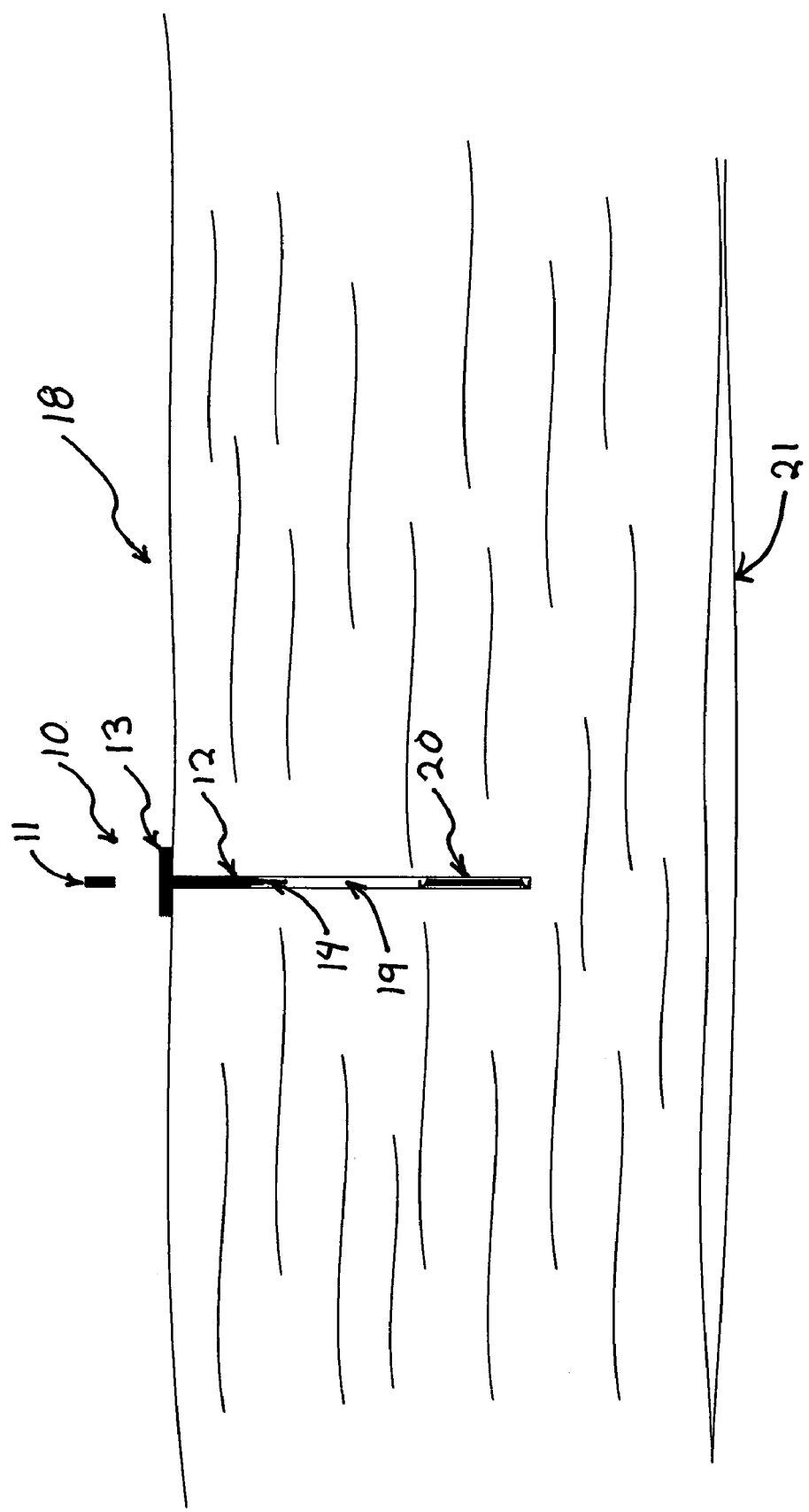
FIG. 9 is a cross sectional drawing though the center of the first embodiment of the kerf spacer including the additional handle portion, perpendicular to the chainsaw kerf, and parallel to the longitudinal axis of the log, showing the proper installation of the chainsaw kerf spacer in relation to the chainsaw bar.

FIG. 9 is a cross sectional view through the center of the chainsaw kerf spacer 10, parallel to the longitudinal axis of the log 18, and perpendicular to the chainsaw kerf, which shows the kerf spacer properly installed in relation to chainsaw bar 20.

Figure 10:
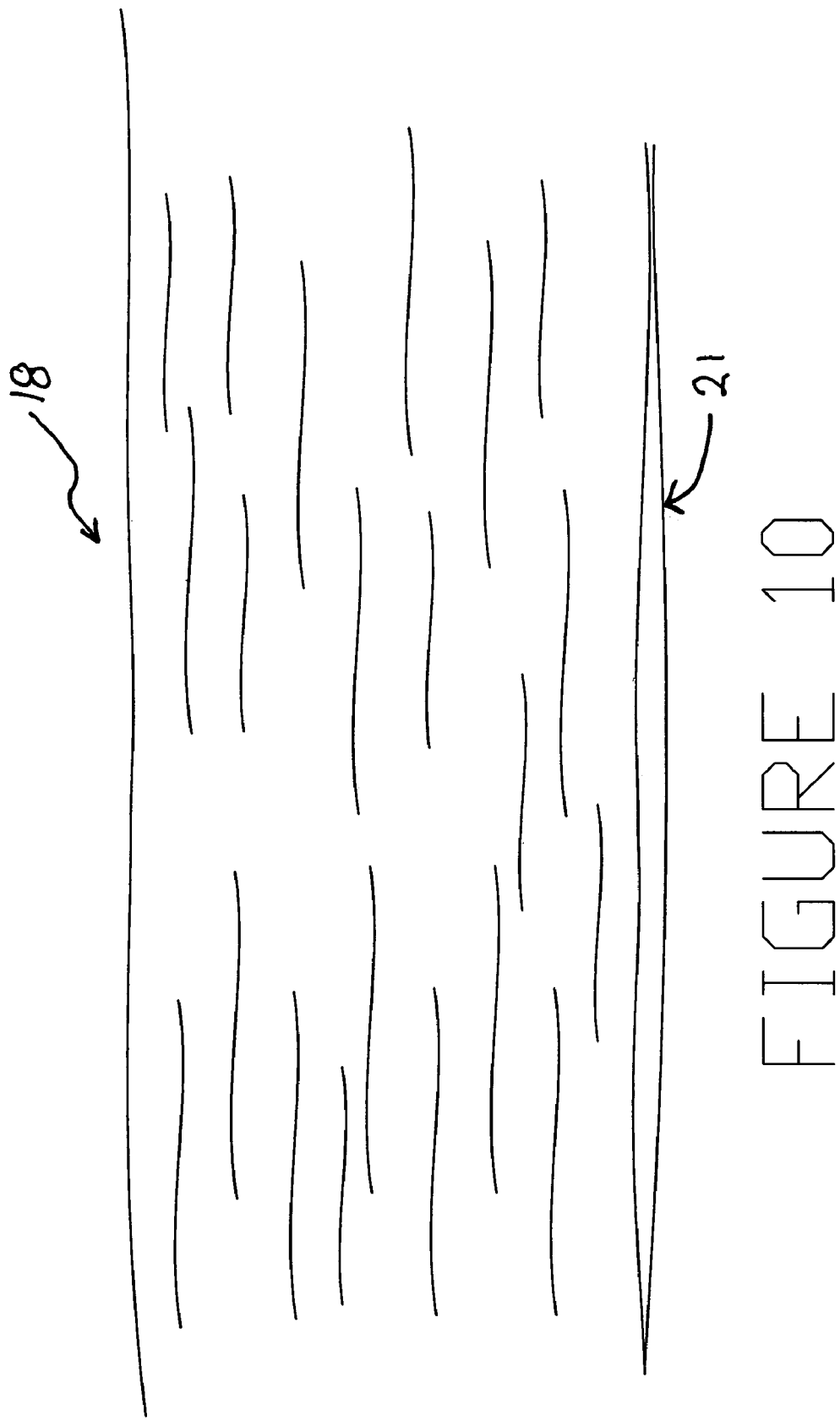
FIG. 10 is a side view of a tree trunk lying horizontally on the ground demonstrating how a slight curve in the trunk can result in the trunk being supported only on the ends.

FIG. 10 illustrates a common situation encountered by a person who is cutting wood with a chainsaw. A log 18 is lying horizontally on the ground 21. Because of the slight curve of the log, it is supported by its ends.

Figure 12:
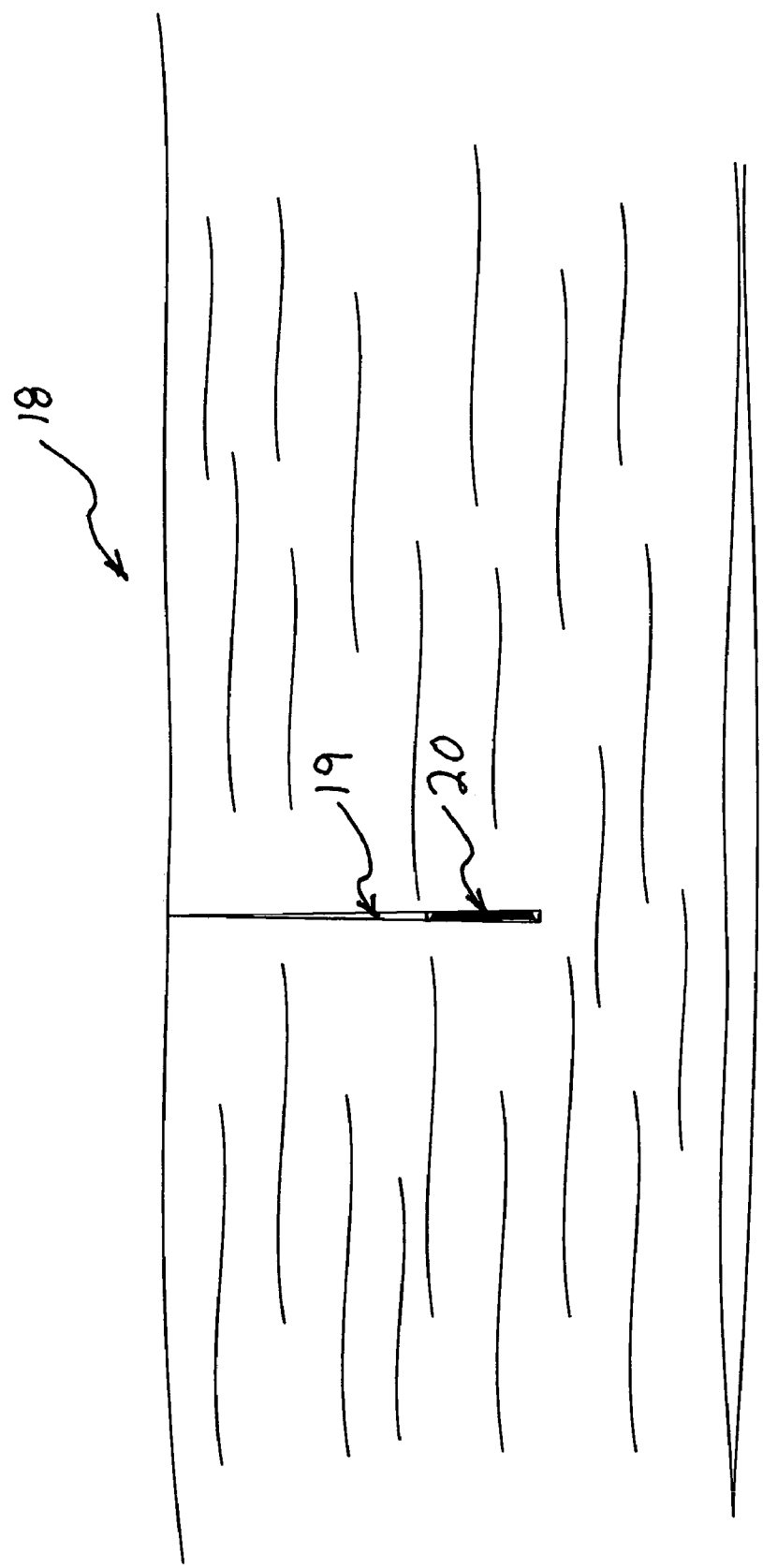
FIG. 12 is a cross sectional drawing though the center of a log and perpendicular to the chainsaw kerf, and parallel to the longitudinal axis of the log, showing the chainsaw bar pinched as a result of uneven support without the aid of a spacing device

FIG. 12 illustrates the result of attempting to cut the log of FIG. 10 into smaller pieces. As the chainsaw bar 20 cuts through the log 18, the uncut portion of the log becomes a hinge point, and the weight of the log causes the chainsaw kerf 19 to close, pinching the chainsaw bar 20.

Figure 11:
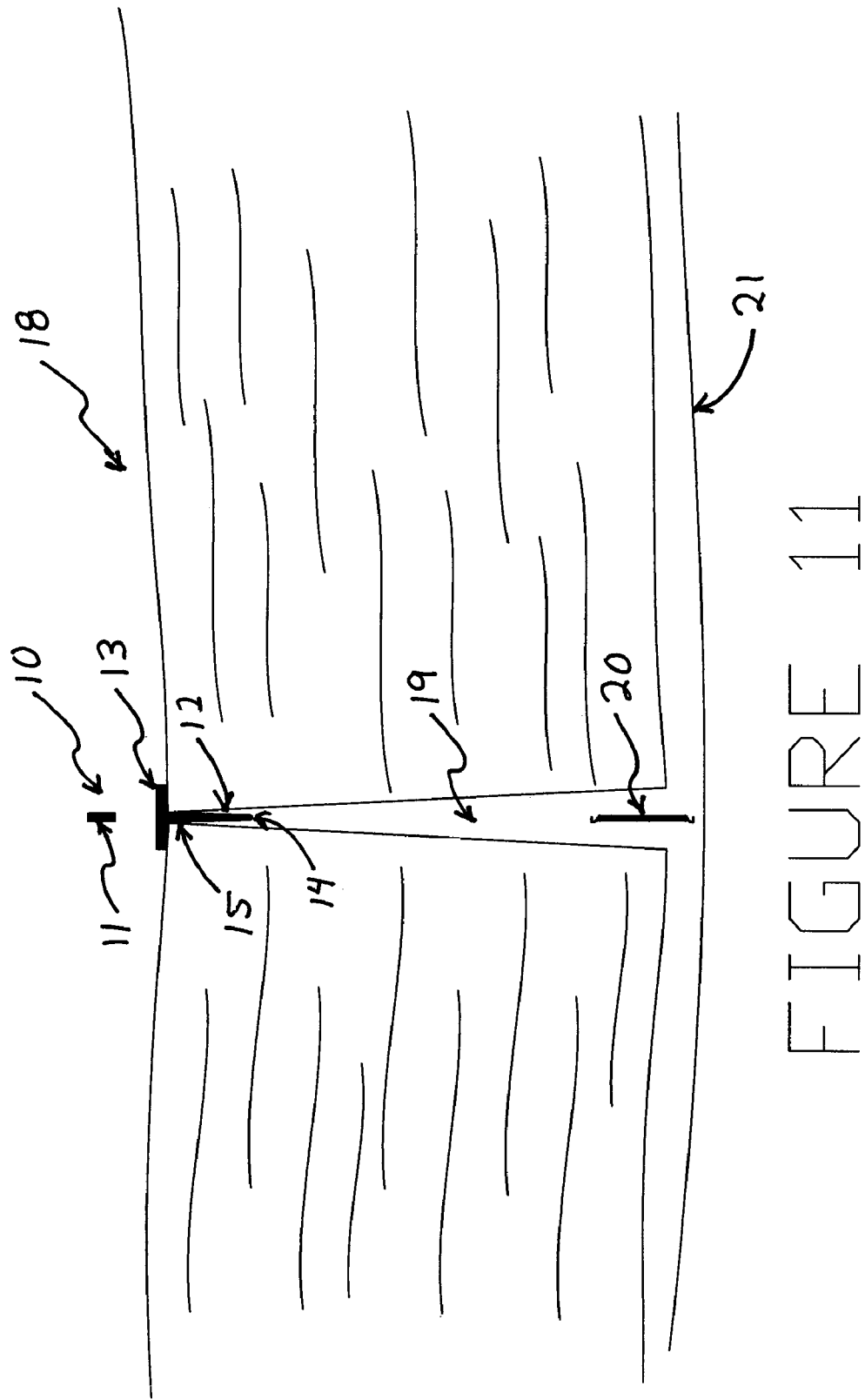
FIG. 11 is a cross sectional drawing though the center of a log and the first embodiment of the kerf spacer, and perpendicular to the chainsaw kerf, and parallel to the longitudinal axis of the log, showing the result of using the chainsaw kerf spacer.

FIG. 11 illustrates the result of cutting through a log similar to the one shown in FIG. 10 while using the chainsaw kerf spacer. Once the chainsaw bar 20 has cut approx 6"-8" into the log, the chainsaw kerf spacer 10 is inserted into the chainsaw kerf 19. As the chainsaw bar 20 continues cutting through the log, the uncut wood becomes a hinge point and the kerf 19 begins to close. However, before the chainsaw bar is pinched, the chainsaw kerf spacer 10 prohibits the kerf 19 from closing any further. When this happens, the chainsaw kerf spacer 10 becomes the new hinge point, resulting in the bottom of the kerf 19 actually becoming wider after the cut is completed.

A second and preferred embodiment 34 is particularly illustrated in FIGS. 14-19. In the second and preferred embodiment, an upper portion 32 and a lower wedge portion 33 are joined by a cylindrical pivotal member, allowing the upper portion 32 to be rotated in relation to the lower portion 33, thereby making the upper portion 32 act as a depth limiting feature. The lower wedge portion 33 of the chainsaw kerf spacer 34 may also be textured to aid in keeping the kerf spacer 34 in place until the cut is completed. The texturing may be a roughened surface, or a series of grooves running parallel to the narrow end of the lower wedge portion.

Figure 23B:
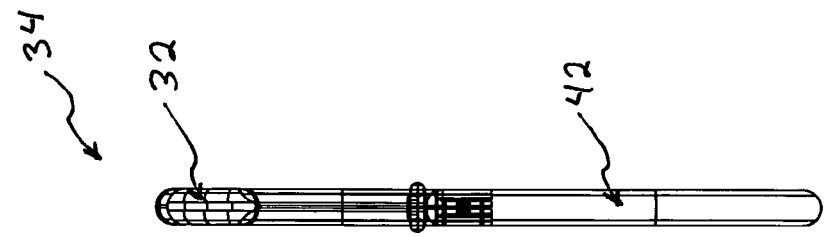
FIG. 23B is a side view of the preferred embodiment variation where the lower portion is planar.
Figure 23A:
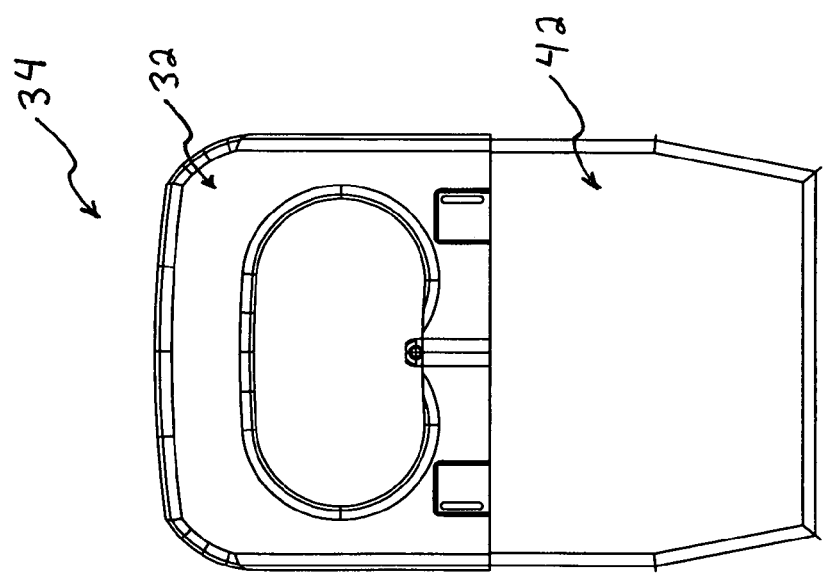
FIG. 23A is a front plan view of a preferred embodiment variation where the lower portion is planar.

FIG. 23A and FIG. 23B illustrate a variation of the preferred embodiment, wherein the lower portion of the spacer 42 is planar and slightly thinner than the width of a chainsaw kerf.

Figure 14:
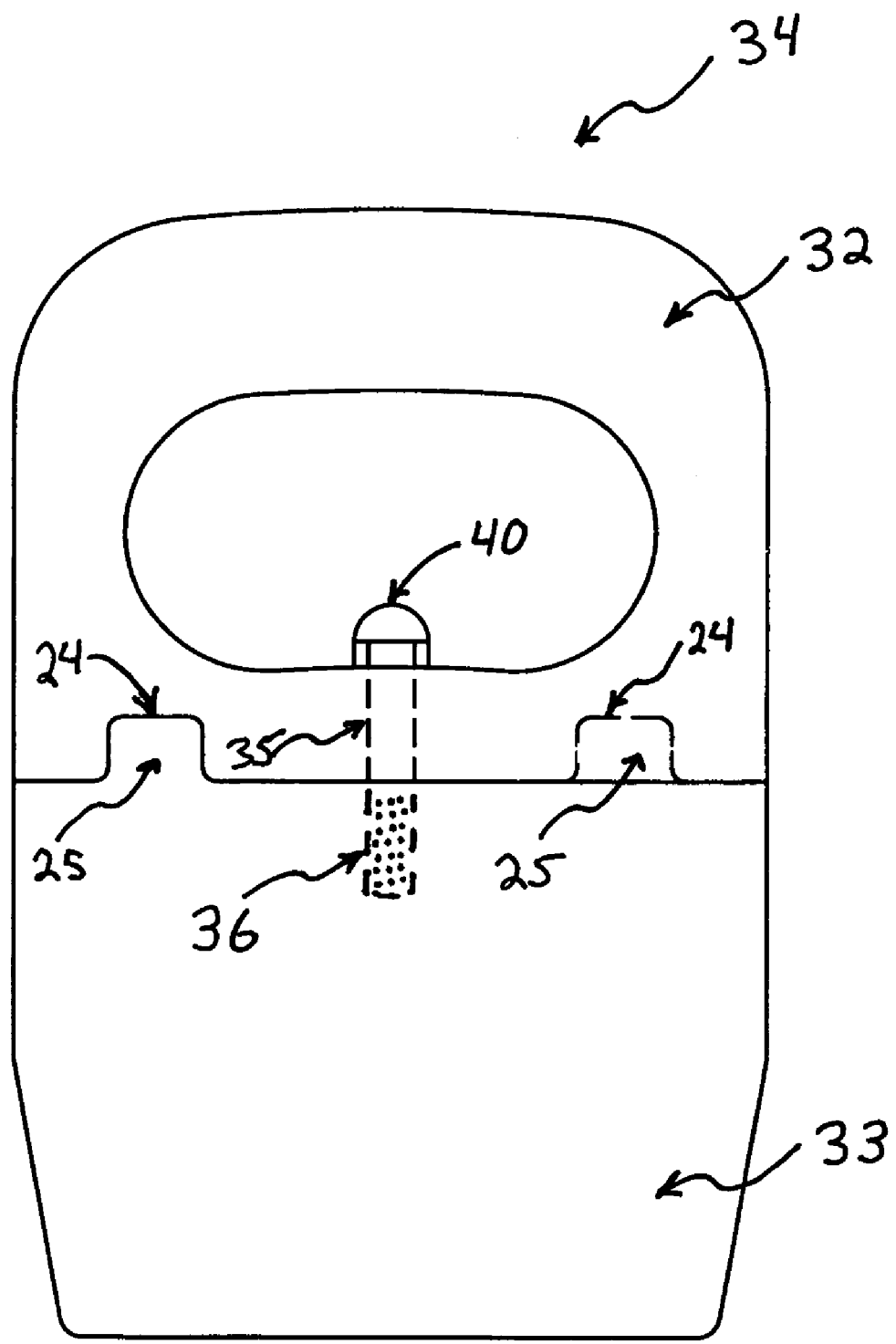
FIG. 14 is a side view of the second and preferred embodiment with pivoting upper portion.
Figure 15:
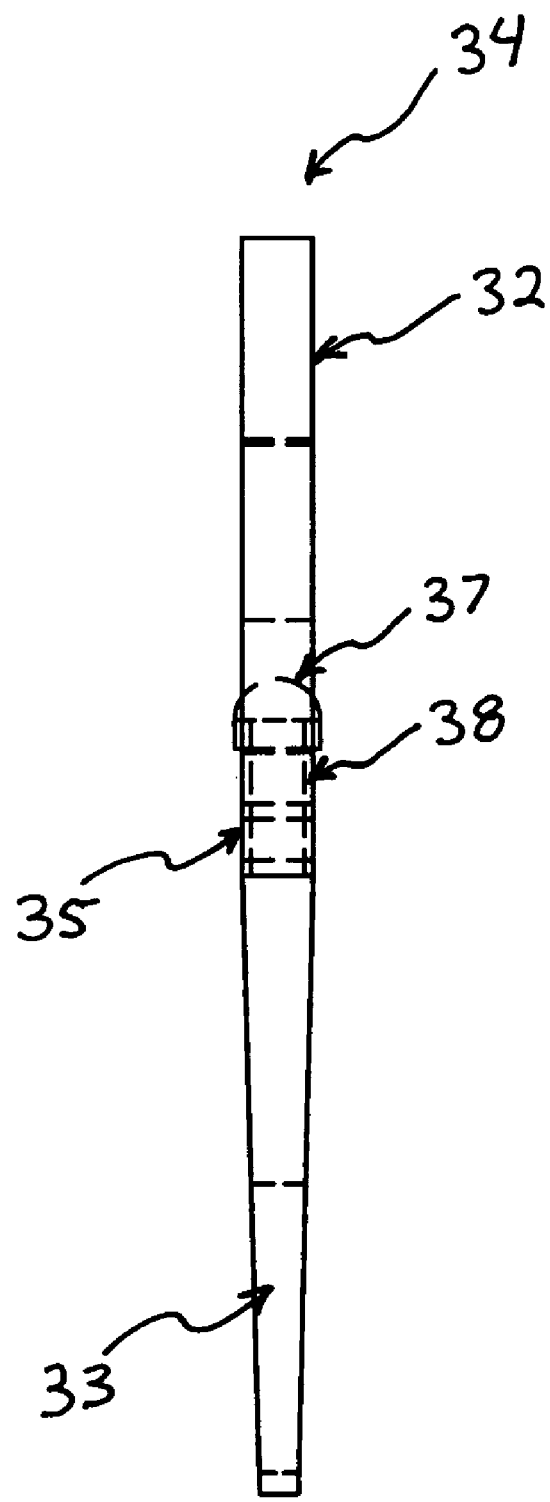
FIG. 15 is an end view of the second and preferred embodiment with pivoting upper portion, with the upper portion not rotated in relation to the lower portion
Figure 16:
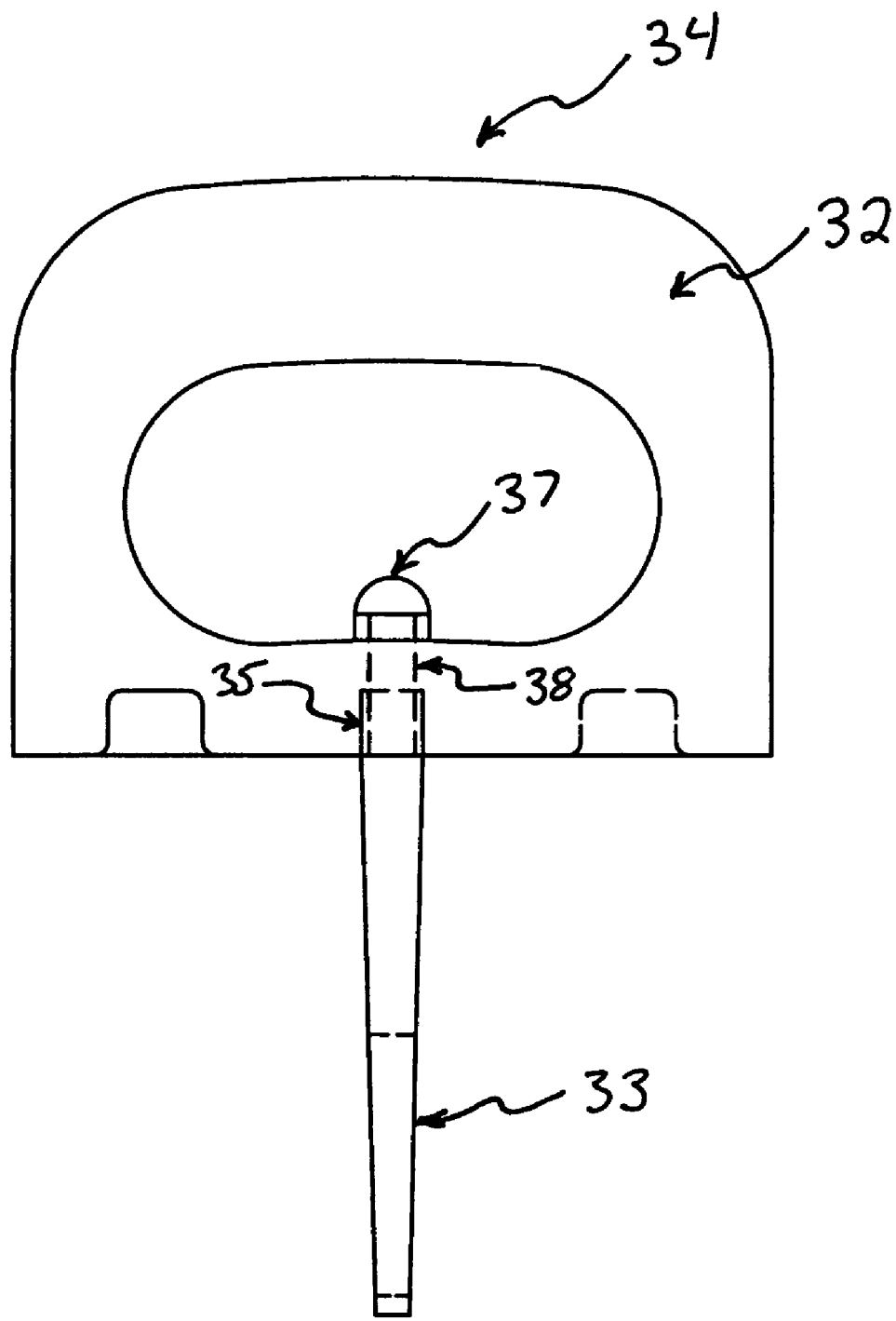
FIG. 16 is a side view of the second and preferred embodiment with pivoting upper portion with the upper portion rotated ninety degrees in relation to the lower portion.
Figure 17:
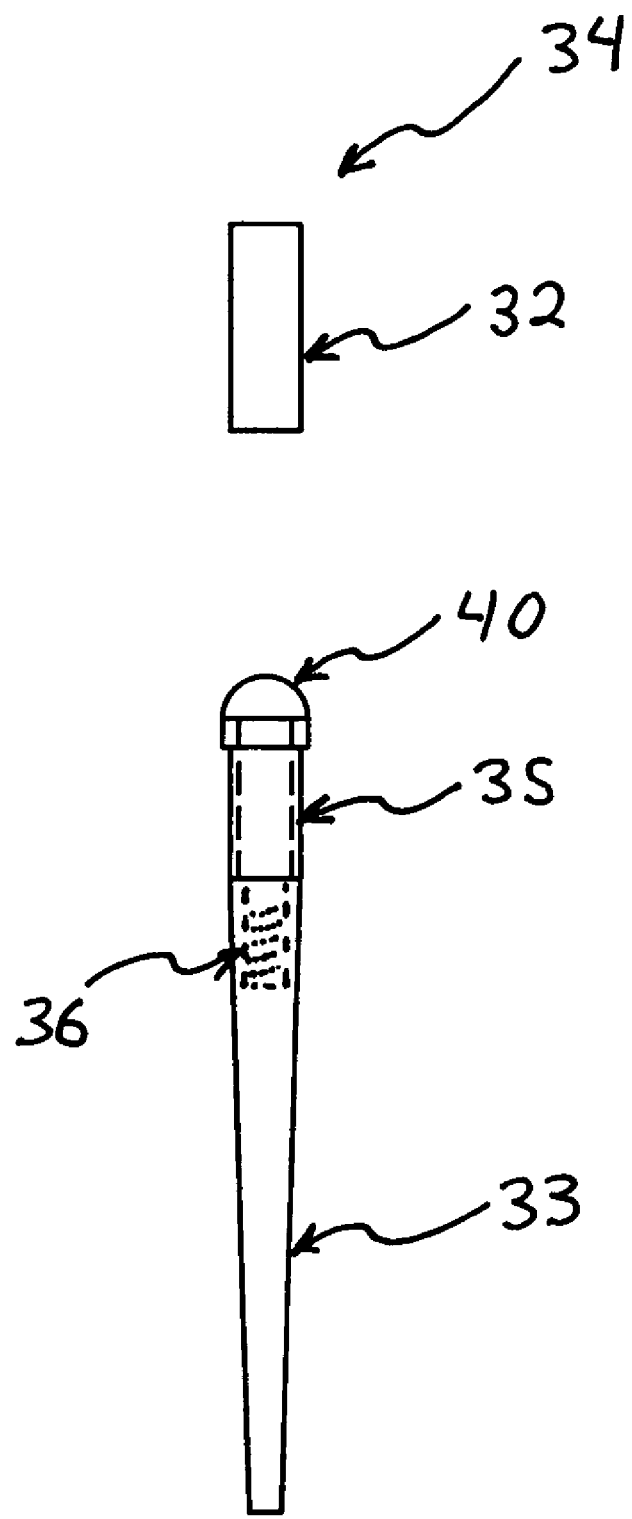
FIG. 17 is a cross sectional view of the second and preferred embodiment, through the center of the device in the non-rotated position.
Figure 18A:
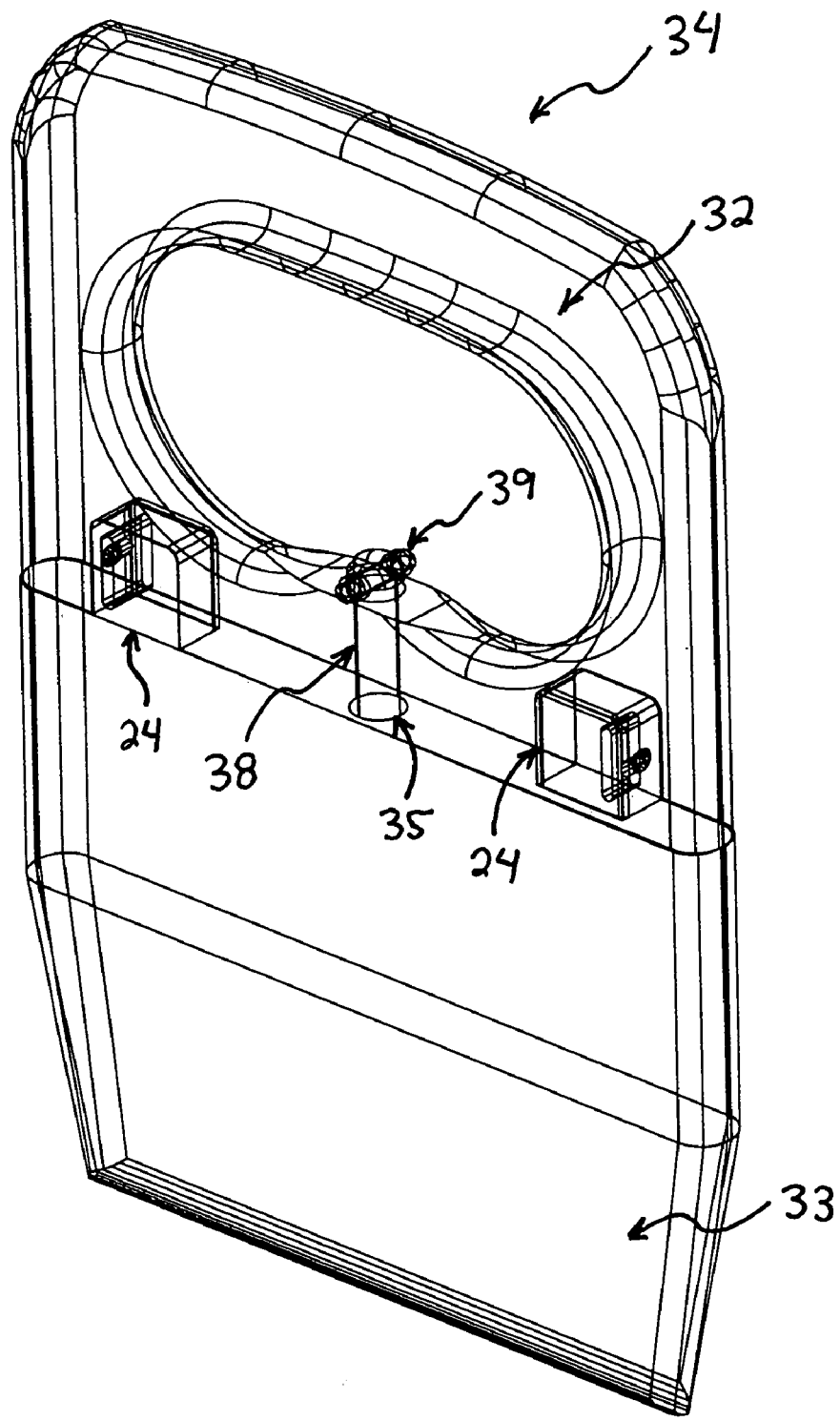
FIG. 18A is a wire frame drawing of the second and preferred embodiment, with the upper portion not rotated
Figure 18B:
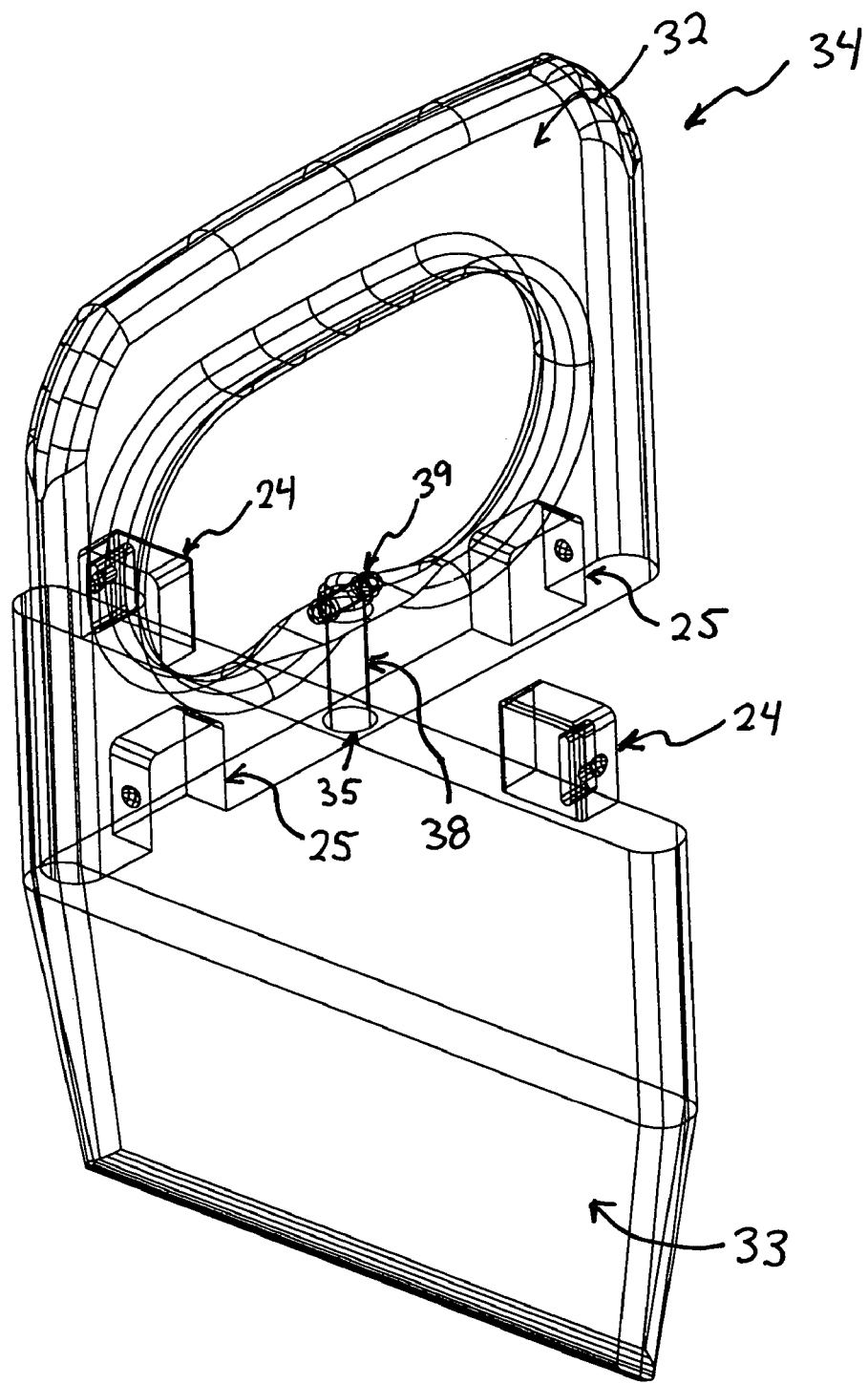
FIG. 18B is a wire frame drawing of the second and preferred embodiment with the upper portion rotated 90 degrees in relation to the bottom portion.
Figure 19A:
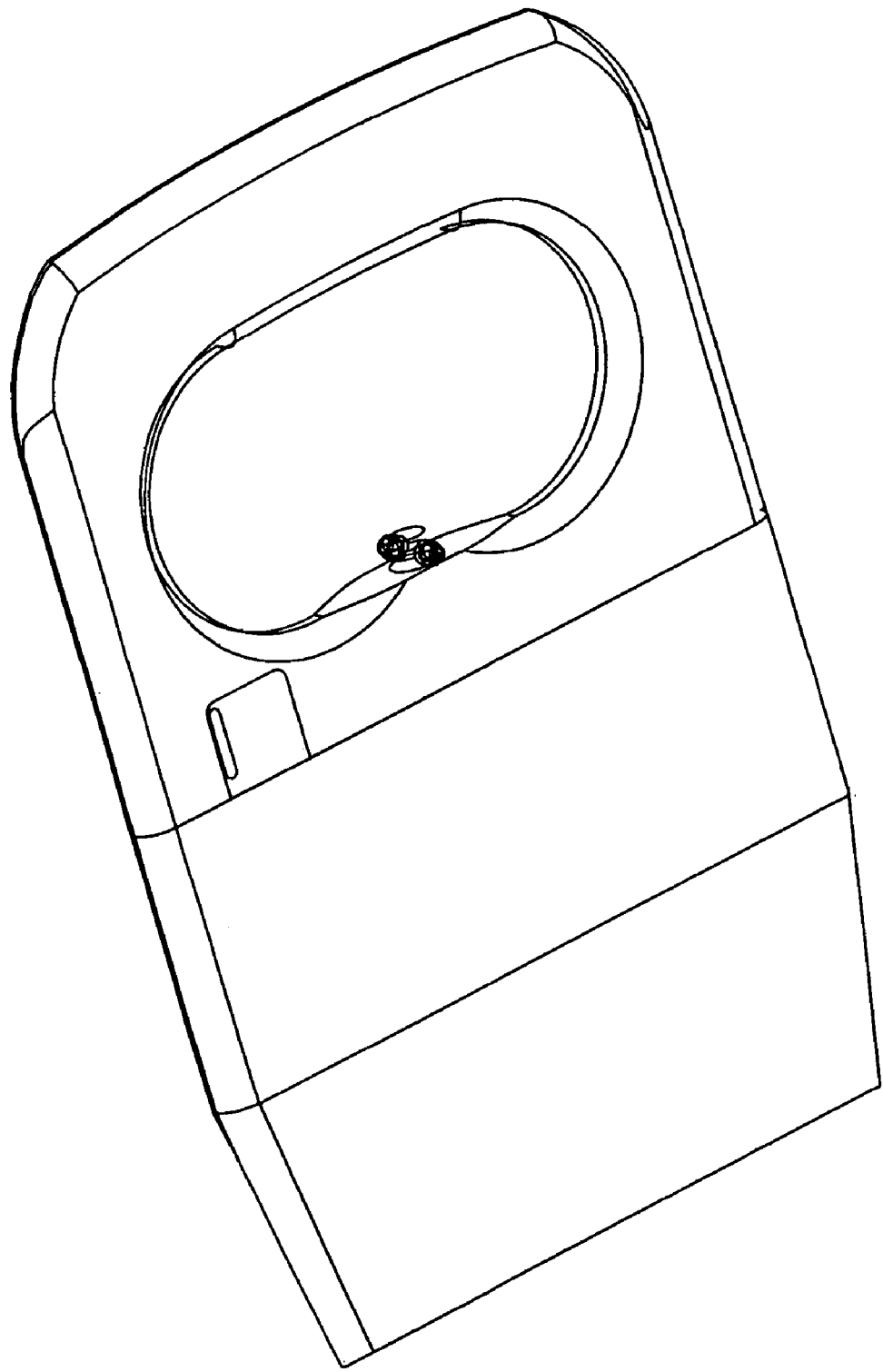
FIG. 19A is a solid model drawing with shading, illustrating the second and preferred embodiment with the upper portion not rotated in relation to the bottom portion.
Figure 19B:
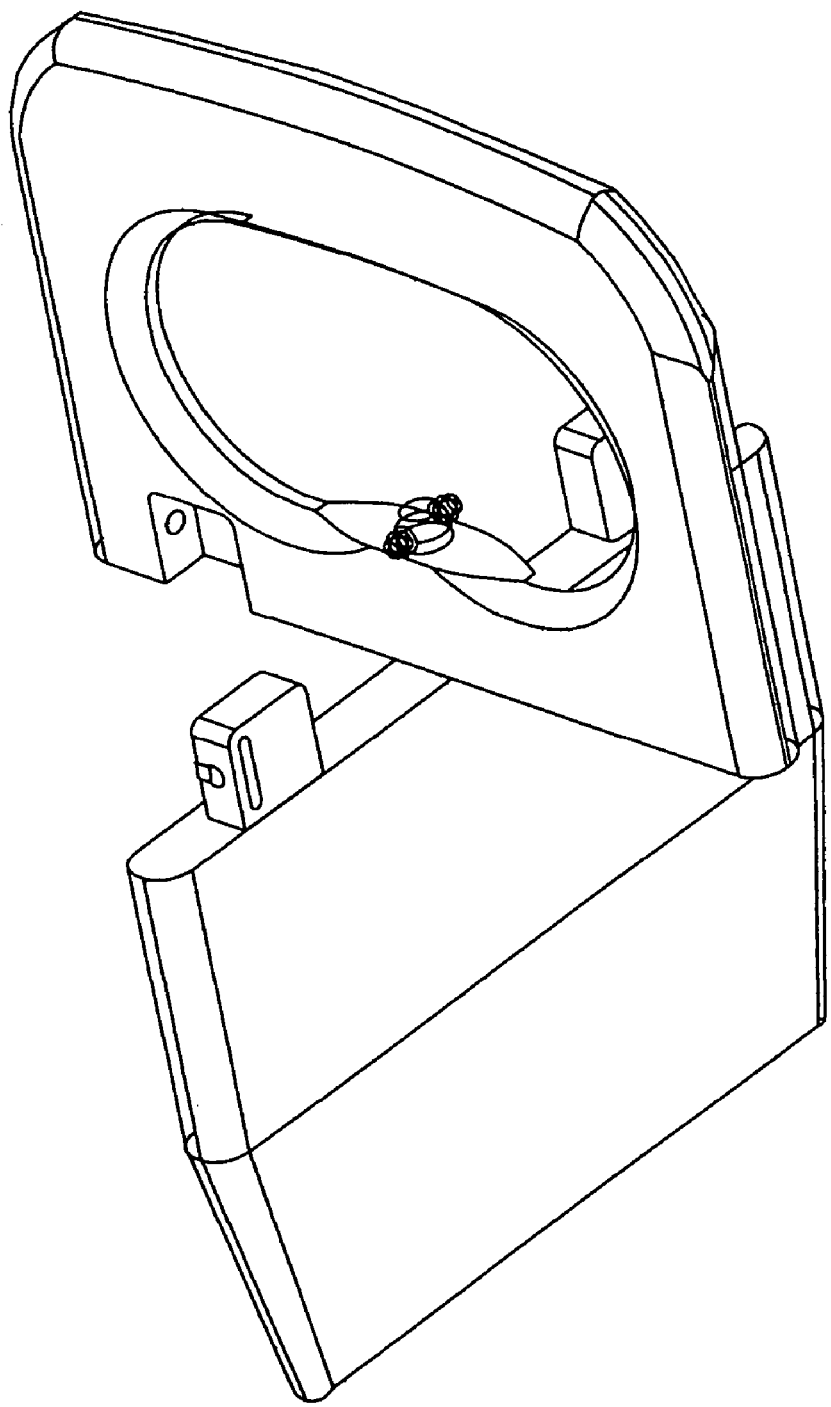
FIG. 19B is a solid model drawing with shading, illustrating the second and preferred embodiment with the upper portion rotated 90 degrees in relation to the bottom portion.

The cylindrical pivot member on the preferred embodiment 34 may be a threaded bolt 40 that passes through a clearance hole 35 in the upper portion, and threads into a tapped mating hole 36 in the lower wedge portion as illustrated in FIG. 14 and FIG. 17. The cylindrical pivot member may also be formed as a unitary structure 38 with the lower wedge portion 33, and pass through a clearance hole 35 in the upper portion and be secured with a friction cap as shown in FIG. 15 and FIG. 16. The unitary cylindrical pivot member 38 may also be secured with a pin 39 as shown in FIG. 18A and FIG. 18B.

Figure 20:
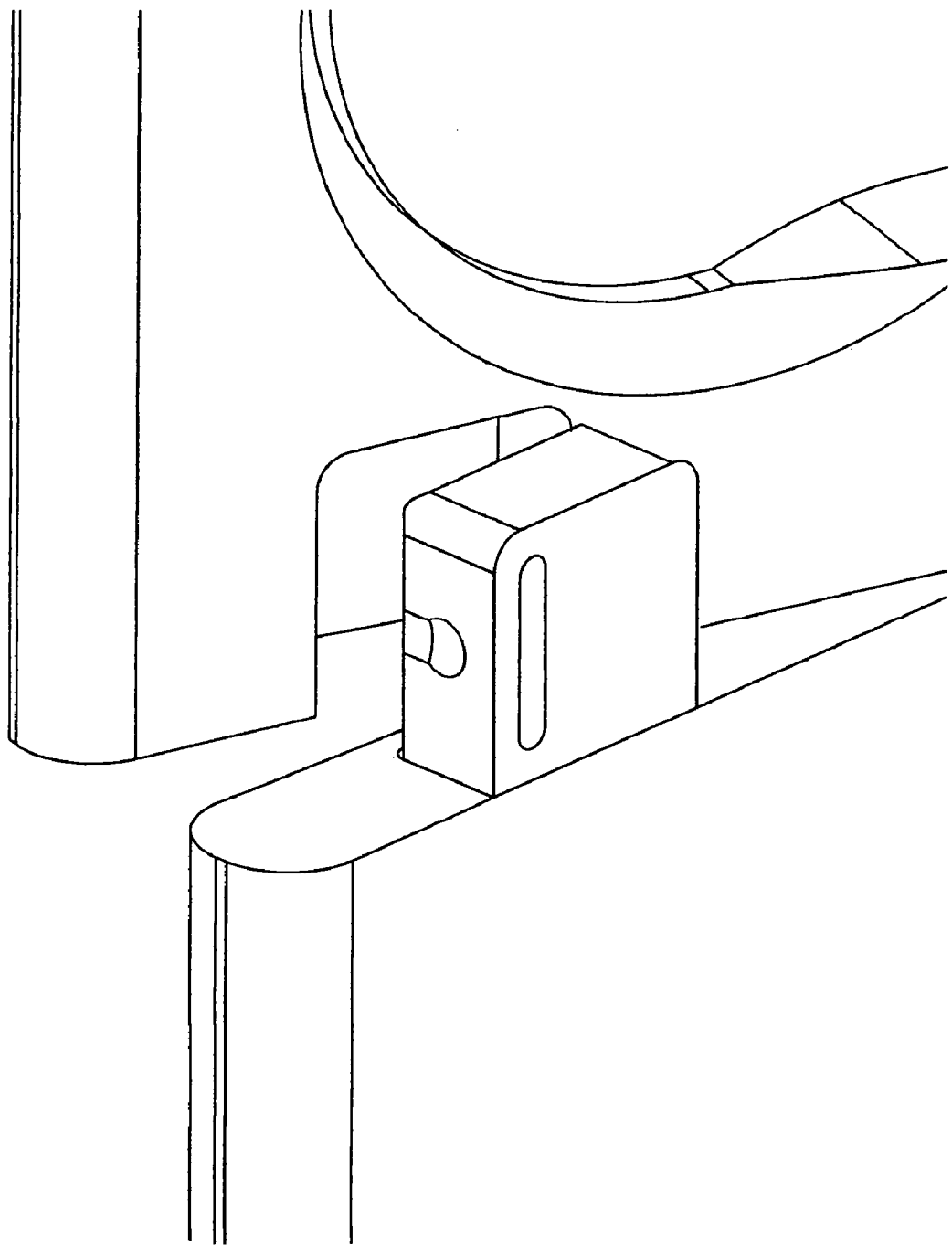
FIG. 20 is a solid model drawing with shading, illustrating the second and preferred embodiment with stop and locking mechanism from the upper left view.
Figure 21:
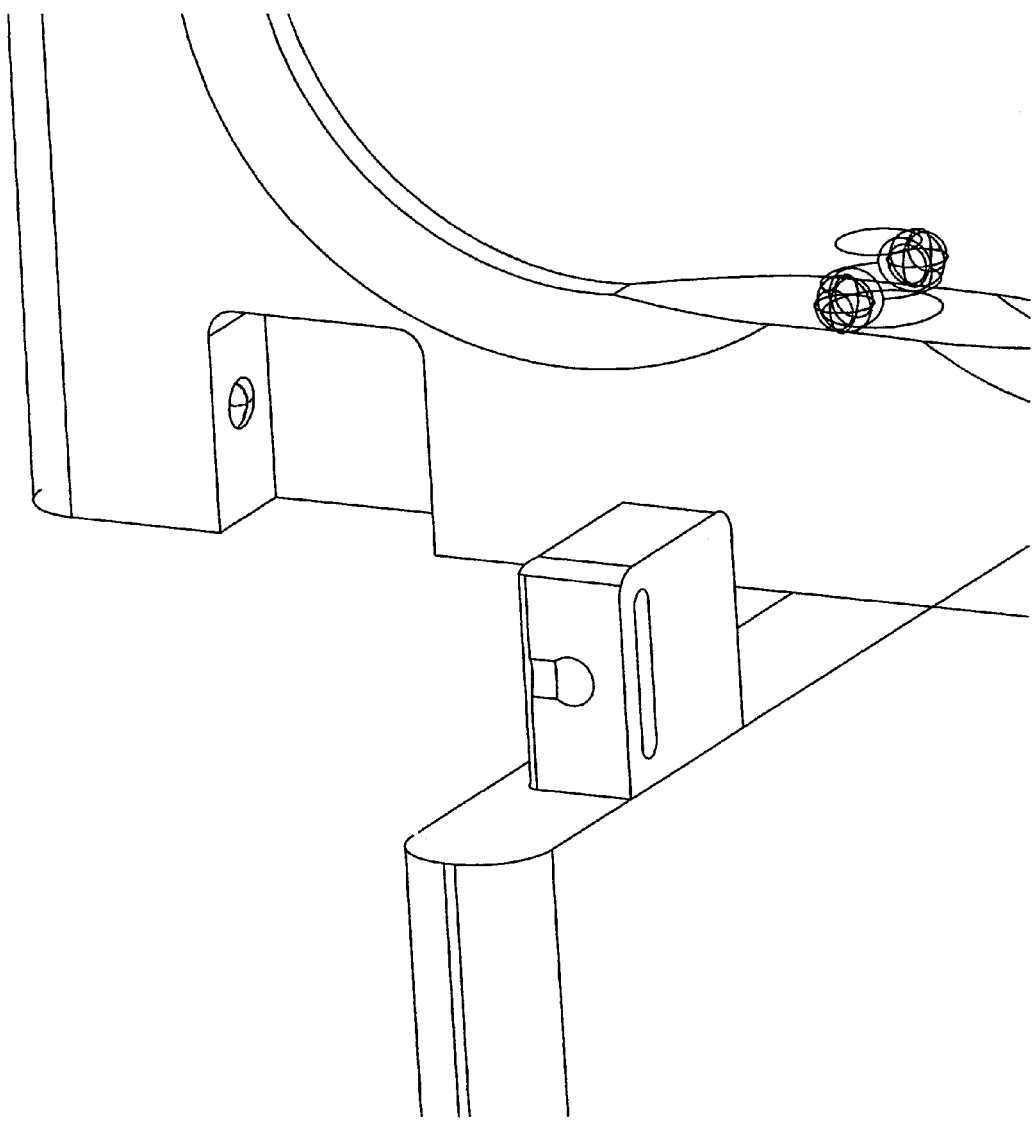
FIG. 21 is a solid model drawing with shading, illustrating the second and preferred embodiment with the cavity for the stop and locking mechanism, from the upper right view.

To use the preferred embodiment, the kerf spacer 34 is inserted into the chainsaw kerf 19 approximately halfway up the lower wedge portion 33. The upper handle portion 32 is then rotated approximately 90 degrees in relation to the lower wedge portion 33, making the upper handle portion 32 roughly perpendicular to the chainsaw cut. The chainsaw kerf spacer 34 is then pushed deeper in the chainsaw kerf 19 until the rotated handle portion 32 contacts the log. The rotated handle portion 32 will keep the kerf spacer 34 from dropping any further into the chainsaw kerf 19 during the balance of the cutting operation or when the cut is completed. In the preferred embodiment 34, the lower wedge portion 33 provides the identical function as the lower wedge portion 12 in the first embodiment. After a cut is completed, the upper portion 32 may be rotated back to a coplanar position with the bottom wedge portion, and locked in place for ease of carry or storage. The bottom surface of the upper portion 32 may be textured or serrated to assist in gripping the bark surface to hold it in place. The lower portion 33 is provided with stop and lock features 24 that fit into cavities 25 in the top portion, to act as retention devices to keep the upper portion 32 and lower portion 33 from rotating when the device is being carried. The stop and lock features may also be provided on the upper portion with the cavities formed into the lower portion. The stop and lock features are preferably formed of the same material as the portion of the invention that they are attached to, creating a unitary structure. However, the stop and lock features can also be formed of a dissimilar material to the portion of the invention they are attached to, and be held in place by over-molding, screws, fasteners, press fit, etc. FIGS. 20 and 21 illustrate one possible method of accomplishing this function, and are exemplary only and do not limit the scope of this feature. It is to be understood that there many features that can be incorporated that will accomplish this stop and lock function The second and preferred embodiment 34 eliminates the need for a middle depth limiting portion.

Having thus described in detail several embodiments of the present invention, it is to be appreciated and will be apparent to those skilled in the art that many physical changes, only a few of which are exemplified in the specification of the invention, could be made without altering the inventive concepts and principles embodied therein. It is also to be appreciated that numerous embodiments incorporating only part of the preferred embodiments are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than the foregoing description, and all alternate embodiments and changes to this embodiment which come within the meaning and range of equivalency of said claims are therefore to be embraced therein.

I claim:

1. A wood cutting saw kerf spacer to be used in conjunction with a motorized chainsaw, intended to be inserted into a chainsaw kerf, without the aid of tools, to keep the kerf open, thereby keeping the chainsaw bar from becoming pinched in the kerf while cutting, comprising:

a structure having an upper portion and lower portion, wherein said lower portion forms an elongated wedge wherein the thickest portion of the wedge is immediately adjacent to the upper portion, and has a thickness approximately equal to the width of a chainsaw kerf, and the thinnest portion of the wedge is the bottom most portion of the device, and has a thickness approximately 50 percent thinner than the thickest portion, and wherein said upper portion is substantially planar, and includes an elongated aperture running parallel to a line dividing the upper and lower portions, forming a handle to assist in removing said spacer from the chainsaw kerf after the cut is finished, and wherein said upper and lower portions are joined by a cylindrical shaft running parallel to the planar surfaces of the upper portion and perpendicular to the line dividing the upper and lower portions, said shaft forming a pivotal axis thereby allowing the upper portion to be rotated in relation to the lower portion thus making the upper portion a depth limiting feature when rotated, to keep the spacer from dropping further into the chainsaw kerf once the spacer is fully inserted; at least one stop and lock feature to maintain the upper portion of the kerf spacer in the non-rotated position.

2. The chainsaw kerf spacer of claim 1 where the device is constructed from plastic.

3. The chainsaw kerf spacer of claim 1 where the device is constructed from composite material.

\* \* \* \* \*